United States Patent
Norimatsu et al.

(10) Patent No.: US 9,887,638 B2
(45) Date of Patent: Feb. 6, 2018

(54) POWER CONVERSION APPARATUS WITH FREQUENCY OPERATION CHANGE BASED ON INPUT VOLTAGE

(71) Applicant: Hitachi, Ltd., Chiyoda-ku, Tokyo (JP)

(72) Inventors: Yasuaki Norimatsu, Tokyo (JP); Akihiko Kanouda, Tokyo (JP); Yuuichi Mabuchi, Tokyo (JP); Tadahiko Chida, Tokyo (JP); Takuya Ishigaki, Tokyo (JP); Takae Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/052,274

(22) Filed: Feb. 24, 2016

(65) Prior Publication Data
US 2016/0254758 A1 Sep. 1, 2016

(30) Foreign Application Priority Data
Feb. 27, 2015 (JP) .................................. 2015-038181

(51) Int. Cl.
*H02M 3/335* (2006.01)
*H02M 5/458* (2006.01)
(Continued)

(52) U.S. Cl.
CPC ............. *H02M 5/458* (2013.01); *H02M 1/32* (2013.01); *H02M 3/335* (2013.01);
(Continued)

(58) Field of Classification Search
CPC ............. H02M 3/3353; H02M 3/3376; H02M 3/33507; H02M 3/33569;
(Continued)

(56) References Cited

U.S. PATENT DOCUMENTS

2005/0152159 A1 7/2005 Isurin et al.
2005/0180175 A1 8/2005 Torrey et al.
(Continued)

FOREIGN PATENT DOCUMENTS

JP 2001-209445 A 8/2001
JP A-2001-282189 10/2001
(Continued)

OTHER PUBLICATIONS

Extended European Search Report issued in counterpart European Application No. 16154700.5 dated Jul. 26, 2016 (Nine (9) pages).
(Continued)

*Primary Examiner* — Alex Torres-Rivera
(74) *Attorney, Agent, or Firm* — Crowell & Moring LLP

(57) ABSTRACT

If an input voltage of a DC/DC converter is lower than a first voltage value that is set in advance, a converter controller maintains an output voltage of the DC/DC converter within a first voltage range that is set in advance by changing an operation frequency of switching of the DC/DC converter in compliance with the input voltage as a first voltage maintaining control. If the input voltage is higher than a second voltage value that is higher than the first voltage value, the converter controller maintains the output voltage within a second voltage range that is higher than the first voltage range by changing the operation frequency in compliance with the input voltage as a second voltage maintaining control.

10 Claims, 9 Drawing Sheets

(51) Int. Cl.
   *H02M 7/48* (2007.01)
   *H02M 1/32* (2007.01)
   *H02M 7/487* (2007.01)

(52) U.S. Cl.
   CPC .......... *H02M 7/4807* (2013.01); *H02M 7/487* (2013.01); *Y02B 70/1433* (2013.01)

(58) Field of Classification Search
   CPC . H02M 2001/0058; H02M 2001/0022; H02M 2001/0054; H02M 2001/0032; H02M 7/487; H02M 7/4807; H02M 7/4826; H02M 2007/4815; H02M 2001/0096; H02J 3/383; Y02B 70/1433; Y02B 70/1491; Y02B 70/1441; Y02B 70/16
   USPC ... 363/15, 16, 17, 20, 21.02, 40, 41, 59, 60, 363/98, 120, 131, 132; 323/906
   See application file for complete search history.

(56) References Cited

U.S. PATENT DOCUMENTS

| | | | | |
|---|---|---|---|---|
| 2009/0196082 A1* | 8/2009 | Mazumder | ............ | H02M 5/458 363/132 |
| 2011/0157928 A1 | 6/2011 | Ku et al. | | |
| 2012/0230062 A1 | 9/2012 | Nagai et al. | | |
| 2013/0314949 A1* | 11/2013 | Chi | ......................... | H02M 1/32 363/17 |
| 2015/0109828 A1* | 4/2015 | Koo | .................. | H02M 3/33553 363/17 |
| 2015/0109833 A1* | 4/2015 | Garrity | .................. | H02M 1/36 363/37 |
| 2015/0333634 A1* | 11/2015 | Yoshida | ............ | H02M 3/33576 363/21.03 |
| 2015/0333635 A1* | 11/2015 | Yan | .................. | H02M 3/33507 363/17 |
| 2016/0141978 A1* | 5/2016 | Matsuoka | ............ | H02M 7/537 363/97 |

FOREIGN PATENT DOCUMENTS

| | | |
|---|---|---|
| JP | A-2003-125576 | 4/2003 |
| JP | A-2013-27270 | 2/2013 |
| JP | A-2013-69267 | 4/2013 |
| JP | A-2014-50156 | 3/2014 |

OTHER PUBLICATIONS

Japanese Office Action issued in counterpart Japanese Application No. 2015-038181 dated Dec. 15, 2017 with English language translation (Twelve (12) pages)).

* cited by examiner

POWER CONVERSION APPARATUS WITH FREQUENCY OPERATION CHANGE BASED ON INPUT VOLTAGE

BACKGROUND OF THE INVENTION

Field of the Invention

The present invention relates to a power conversion apparatus.

Background Art

Since an insulated transformer for system interconnection is driven with a low frequency of several tens of Hz that is the same as a system frequency, there is a problem that a reduction in size and weight is difficult. In recent years, a solid-state transformer (SST) has been studied to apply to a high-voltage and high-power application. The SST has a high frequency transformer and a power circuit such as a DC/DC converter that outputs an alternating current of the system frequency by driving the high frequency transformer, and can substitute for a low frequency transformer of the related art. The high frequency transformer is driven with the high frequency of several tens of Hz to several hundreds of kHz and then it is possible to reduce the size of the high frequency transformer and to realize a significant reduction in size and weight compared to the low frequency transformer alone even if the power circuit and the high frequency transformer are combined.

In addition, the introduction of solar power generation is expanding worldwide as a power application for a system. A power conditioning system (PCS) outputting power of the solar power generation to a system by controlling power thereof has been known.

An inverter device for system interconnection that prevents an increase in noise or loss by substantially and constantly maintaining an operation frequency of a boost converter even if a voltage of DC input power is varied is described in JP-A-2001-209445.

SUMMARY OF THE INVENTION

In order to realize a reduction in size and weight of the PCS, if the SST is applied to the PCS, there is a problem that variation of a wide range of the voltage such as the solar power generation and switching loss of a power device that is used in the power circuit such as the DC/DC converter and the inverter for the high frequency occur.

For example, the voltage variation of the solar power generation is a maximum power point tracking (MPPT) voltage range by weather and an increase of the voltage by an open circuit voltage (OCV) when an output is stopped. For the DC/DC converter and the inverter within the PCS, an electrolytic capacitor and a film capacitor are used. If the voltage is increased, a high voltage-resistant capacitor is used so as not to exceed a rated voltage of the capacitor. Since capacitance and an allowable ripple current value of the capacitor are decreased as the capacitor is high voltage-resistant even at the same size, it is preferable that the rated voltage is decreased to reduce the size and the weight of the capacitor.

In addition, an insulated gate bipolar transistor (IGBT) is generally used as the power device for the PCS. The IGBT is a device suitable for high voltage-resistance, switching thereof is practical at several kHz, and there is a problem that switching loss occurs in driving at several tens of kHz.

In order to solve the above-described problem, according to an aspect of the present invention, there is provided a power conversion apparatus including an LLC resonant type DC/DC converter that changes a voltage of DC power from a power supply; an inverter that converts DC power from the DC/DC converter into AC power; a converter controller that controls the DC/DC converter; and an inverter controller that controls the inverter. If an input voltage of the DC/DC converter is lower than a first voltage value that is set in advance, the converter controller maintains an output voltage of the DC/DC converter within a first voltage range that is set in advance by changing an operation frequency of switching of the DC/DC converter in compliance with the input voltage as a first voltage maintaining control. If the input voltage is higher than a second voltage value that is higher than the first voltage value, the converter controller maintains the output voltage within a second voltage range that is higher than the first voltage range by changing the operation frequency in compliance with the input voltage as a second voltage maintaining control.

It is possible to prevent a decrease of efficiency of the power conversion apparatus while reducing the size of the power conversion apparatus.

DETAILED DESCRIPTION OF THE INVENTION

Hereinafter, examples of the invention will be described with reference to the drawings.

Example 1

In the example, as an example of a power conversion apparatus, a PCS that converts DC power from a solar power generation device (hereinafter, solar power generation) into AC power and outputs AC power to a system will be described.

First, a configuration of the example is described below.

Figure 1:
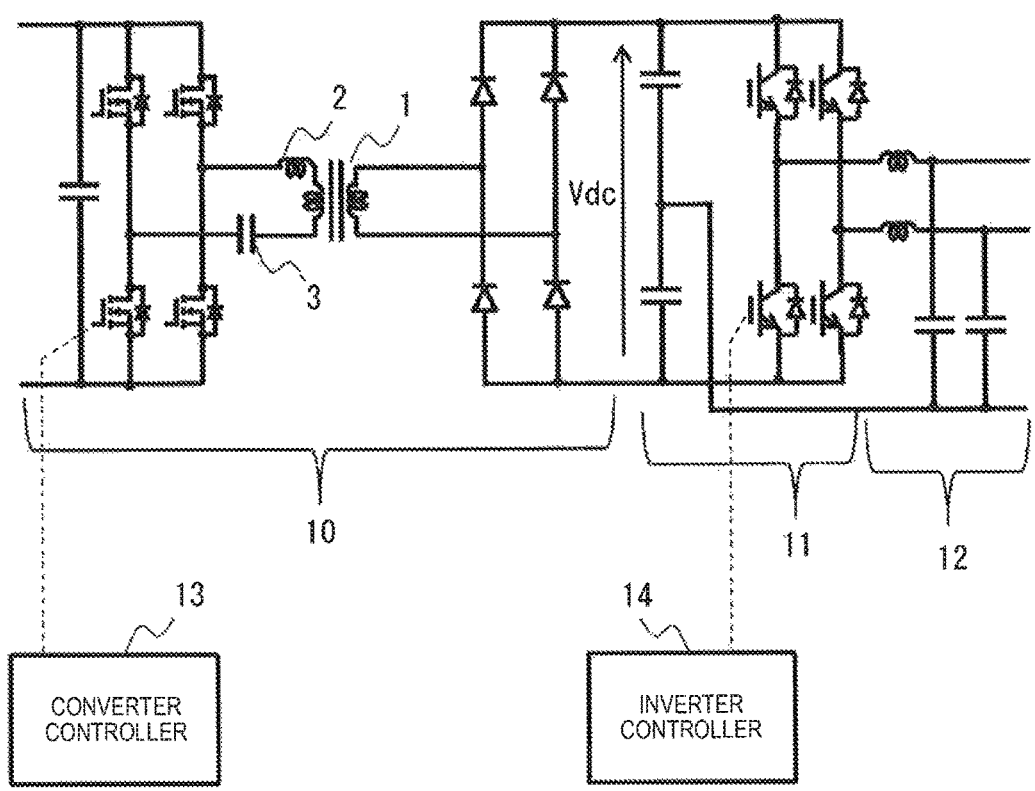
FIG. 1 illustrates a configuration of a PCS of Example 1.

FIG. 1 illustrates a configuration of the PCS of Example 1.

The example is assumed to be a PCS of a class of several kW to several tens of kW interconnecting to a low voltage (for example, a system of 100 V and 200 V). The PCS includes an H-bridge type LLC resonant DC/DC converter (hereinafter, referred to as an LLC resonant converter) 10, an inverter 11, an output filter 12, a converter controller 13, and an inverter controller 14.

The LLC resonant converter 10 is connected to the solar power generation and receives DC power from the solar power generation. The LLC resonant converter 10 includes a high frequency transformer 1, converts a voltage of DC power, and outputs DC power after performing H-bridge diode rectification. The three-phase inverter 11 converts DC power output from the LLC resonant converter 10 into AC power. The output filter 12 of the LLC smoothes AC power output from the inverter 11. The converter controller 13 controls a control frequency (operation frequency) of the LLC resonant converter 10. The inverter controller 14 pulse width modulation (PWM)-controls the inverter 11.

Since a primary side (solar power generation side) of the LLC resonant converter 10 is a low voltage of equal to or less than 600 V, it is assumed that a MOS FET suitable for high frequency driving is applied as a power device (driving device). As a switching frequency, several tens of kHz to several hundreds of kHz are assumed. As the MOS FET, SiC MOS FET suitable for high voltage-resistant and high frequency switching may be applied or another MOS FET having the same function may be applied.

A secondary side (inverter 11 side) of the LLC resonant converter 10 is assumed to be smoothed by a diode. The diode may be a Si diode, may be a Si type Schottky barrier diode or SiC Schottky barrier diode to reduce conduction losses, may be a diode that is used by synchronizing with the SiC MOS FET to reduce losses, or may be another diode having the same function.

The high frequency transformer 1 is connected to a leakage inductance 2 (inductance=Lr) having resonance corresponding to an excitation inductance Lm of the high frequency transformer 1 and a resonance capacitor 3 (capacitance=Cr) to be LLC resonant. Moreover, the leakage inductance 2 may be integrated with the inside of the high frequency transformer 1 as a structure that can adjust a leakage flux constant within the high frequency transformer 1. The resonance capacitor 3 is assumed to use the film capacitor, but may be another capacitor as long as the capacitor has the same function.

Since the switching frequency such as the PWM in the inverter 11 is equal to or less than several kHz that is lower compared to the control frequency of the LLC resonant converter 10, the IGBT is assumed to be applied as a driving element.

Here, effects of the example will be described by using a comparative example.

Figure 2:
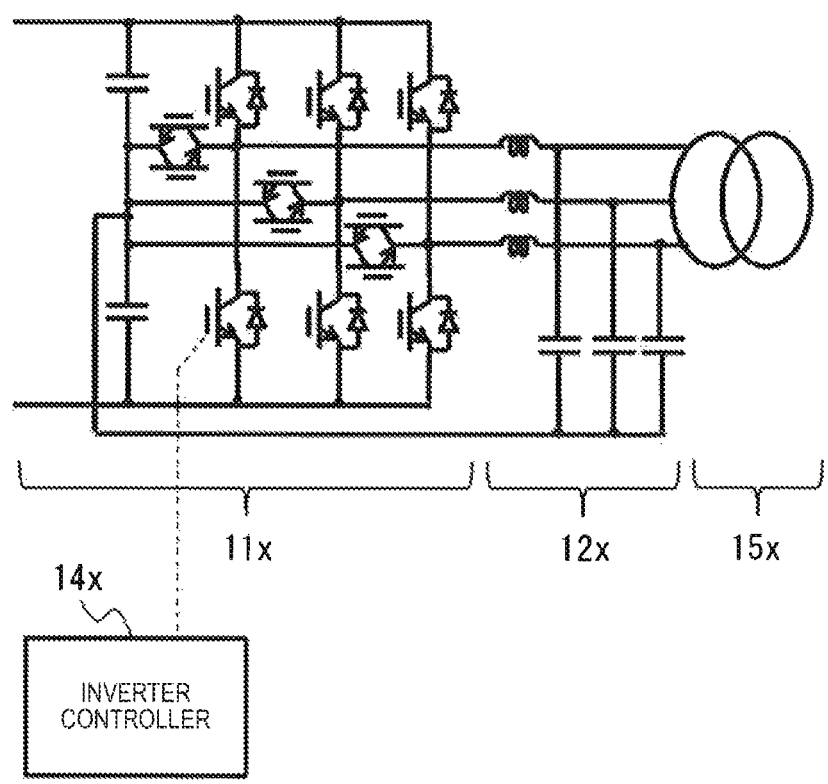
FIG. 2 illustrates a configuration of a PCS of a comparative example.

FIG. 2 illustrates a configuration of the PCS of the comparative example.

The PCS of the comparative example includes an inverter 11x, an output filter 12x, a boost transformer 15x, and an inverter controller 14x. The inverter 11x uses DC power of the solar power generation as an input and converts DC power into three-phase AC power. The output filter 12x smoothes three-phase AC power. The boost transformer 15x boosts a three-phase AC voltage from several hundreds of V to 6.6 kV or more and outputs the three-phase AC voltage to a system. Since the voltage of the solar power generation is greatly changed depending on the weather, the PCS includes a boost chopper between the solar power generation and the inverter 11x, and may correspond to an input voltage variation by MPPT control to output a maximum power of the solar power generation. The boost transformer 15x is large enough in size to be operated with a system frequency.

A frequency of the high frequency transformer 1 of Example 1 is higher compared to a frequency of the boost transformer 15x of the comparative example. Thus, the high frequency transformer 1 can be reduced in size compared to the boost transformer 15x and the PCS of the example can be reduced in size compared to the transformer of the comparative example.

Next, a control method of the LLC resonant converter 10 of the example will be described.

Figure 3:
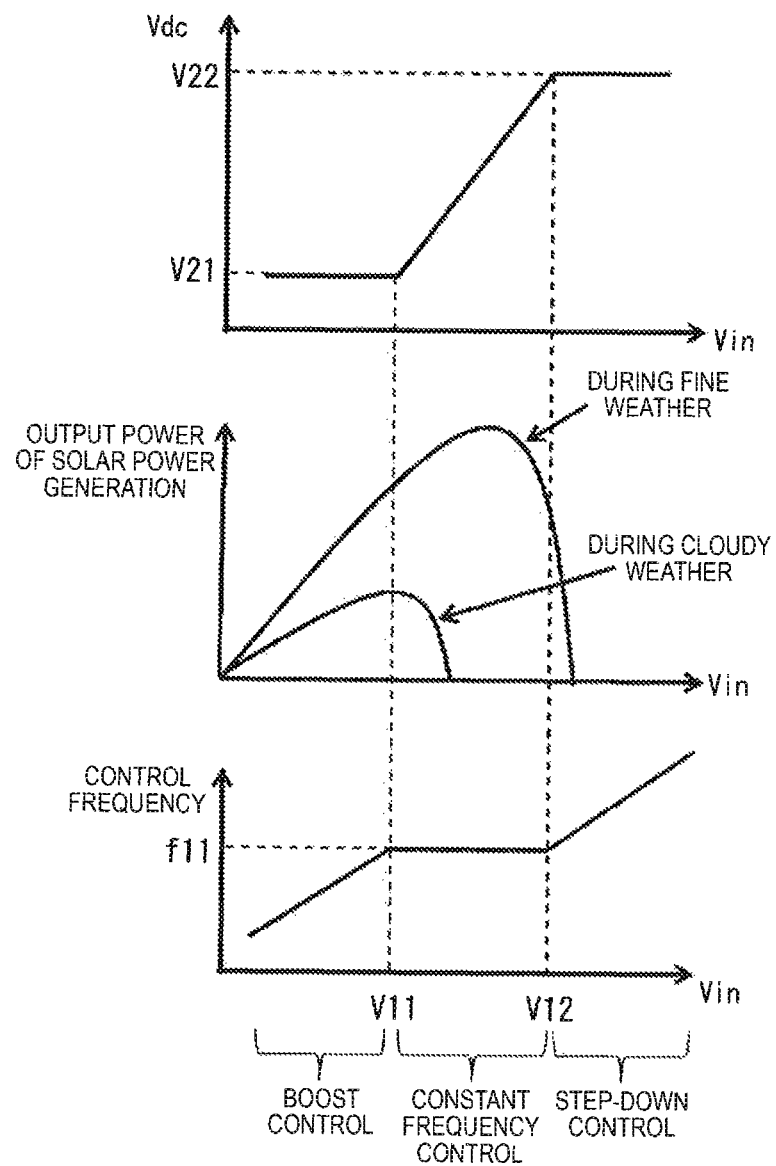
FIG. 3 illustrates a control method of an LLC resonant converter 10 of Example 1.

FIG. 3 illustrates the control method of the LLC resonant converter 10 of Example 1.

An upper stage of the view illustrates a secondary side output voltage Vdc of the LLC resonant converter 10 with respect to an input voltage Vin of the LLC resonant converter 10. An intermediate stage of the view illustrates output power of the solar power generation with respect to the input voltage Vin during fine weather and output power of the solar power generation during cloudy weather. A lower state of the view illustrates the control frequency of the LLC resonant converter 10 with respect to the input voltage Vin. Output power of the solar power generation is changed as indicated in the graph of the intermediate stage with respect to the change of the input voltage Vin from the solar power generation. The converter controller 13 includes the function of the MPPT. The MPPT controls the input voltage such that output power of the solar power generation becomes the maximum. The input voltage in which output power of the solar power generation becomes the maximum is referred to as a maximum power point voltage and a range of the maximum power point voltage is referred to as a maximum power point voltage range respectively during fine weather and during cloudy weather. For example, a lower limit value of the maximum power point voltage range is equal to or less than the maximum power point voltage during cloudy weather (including during rainy weather) and an upper limit value of the maximum power point voltage range is equal to or greater than the maximum power point voltage during fine weather. In addition, a normal input voltage range is set in advance with respect to the input voltage Vin. The normal input voltage range is determined by a lower limit value V11 (first voltage value) and an upper limit value V12 (second voltage value), and includes the maximum power point voltage range. In addition, an output voltage range is set in advance with respect to an output voltage Vdc. The output voltage range is determined by a lower limit value V21 and an upper limit value V22.

The converter controller 13 applies the driving voltage SW (driving signal) of a rectangular wave of the control frequency to a gate of the MOS FET on the primary side of the LLC resonant converter 10. If the input voltage Vin is within the normal input voltage range, the converter controller 13 performs constant frequency control (first frequency maintaining control) such that the control frequency is a specific control frequency f11 (for example, 20 kHz) and the duty ratio is unchanged to be 50% (dead time available). Thus, the secondary side output voltage Vdc is changed in proportion to the input voltage Vin. For example, if the input voltage Vin is changed from the lower limit value V11 to V12 of the normal input voltage range, the output voltage Vdc is changed from the lower limit value V21 to the upper limit value V22 of the output voltage range. The specific control frequency f11 may be the resonant frequency of the LLC resonant converter 10.

If sunlight is poor, the maximum power point voltage is reduced, the input voltage Vin is reduced more than the normal input voltage range, the converter controller 13 reduces the control frequency in compliance with the decrease of the input voltage Vin, causes the duty ratio to be unchanged at 50% (dead time available), and performs the boosting control (first voltage maintaining control). Thus, the converter controller 13 suppresses a drop of the output voltage Vdc and maintains the output voltage Vdc at the lower limit value V21 of the output voltage range.

If the input voltage Vin is increased more than the normal input voltage range in the OCV when the output of the inverter 11 is stopped, the converter controller 13 performs the step-down control (second voltage maintaining control) such that the control frequency is increased in compliance with an increase in the input voltage Vin and the duty ratio is unchanged to be 50% (dead time available). Thus, the converter controller 13 suppresses the increase of the output voltage Vdc and maintains the output voltage Vdc at the upper limit value V22 of the output voltage range.

In addition, as indicated in the upper stage of the view, the output voltage Vdc is continuous with respect to the change of the input voltage Vin. In addition, as indicated in the lower stage of the view, the control frequency is continuous with respect to the change of the input voltage Vin.

In each of the constant frequency control, the step-down control, and the boost control, switching loss of the primary side MOS FET of the LLC resonant converter 10 will be described below.

Figure 4:
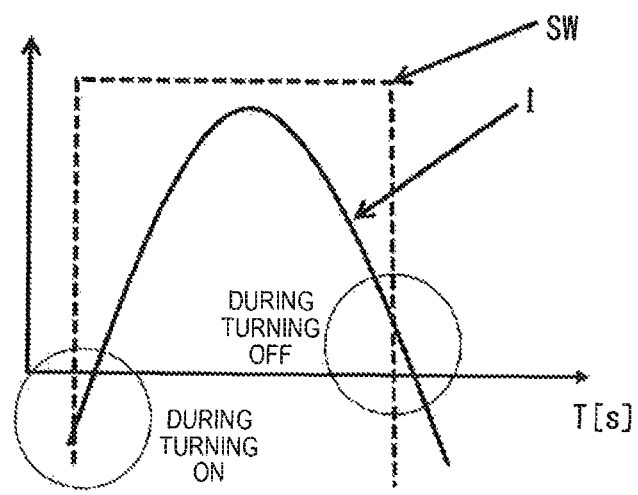
FIG. 4 illustrates a relationship between a driving voltage and a current in constant frequency control.

FIG. 4 illustrates a relationship between a driving voltage SW and a current I in the constant frequency control.

The current I is varied in the resonant frequency of the LLC resonant converter 10. In the constant frequency control, the driving voltage SW has a constant specific operation frequency. When the MOS FET is turned on (increase of the driving voltage SW), since the current I flowing through the MOS FET flows in the opposite direction through a body diode of the MOS FET, it becomes zero-voltage switching (ZVS) and switching loss during turning on does not occur. When the MOS FET is turned off (decrease of SW), since the current I is sufficiently suppressed to be low by being peaked out, switching loss is also small during turning off. As described above, it is possible to continuously maintain the relationship between the waveform of the driving voltage SW and the waveform of the current I by maintaining the control frequency in the specific control frequency. Thus, switching having high efficiency can be realized in the constant frequency control.

Figure 5:
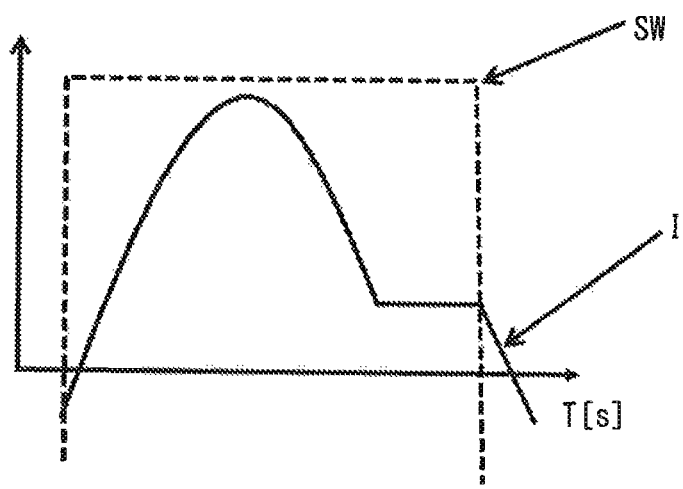
FIG. 5 illustrates a relationship between a driving voltage and a current in boost control.

FIG. 5 illustrates the relationship between the driving voltage SW and the current I in the boost control.

The current I is varied at the same resonant frequency as that during the constant frequency control. Since the control frequency is lower compared to the constant frequency control, a period (pulse within) of the driving voltage SW becomes longer. When the MOS FET is turned on, since the current I flows in the opposite direction through the body diode of the MOS FET, it becomes the ZVS and switching loss does not occur during turning on. When the MOS FET is turned off, since a resonance current flows by the leakage inductance 2 as the current I, switching loss is increased compared to the constant frequency control. However, since the pulse width of the driving voltage SW is extended by reducing the control frequency, the current I during turning off is small and switching having high efficiency can be realized in the boost control.

Figure 6:
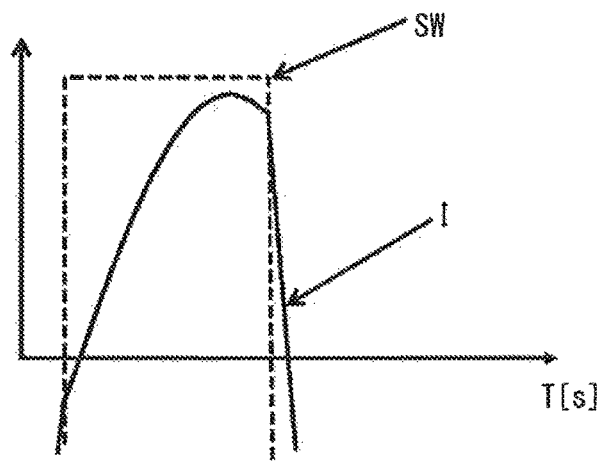
FIG. 6 illustrates a relationship between a driving voltage and a current in step-down control.

FIG. 6 illustrates the relationship between the driving voltage SW and the current I in the step-down control.

The current I is varied at the same resonance frequency as the constant frequency control. Since the control frequency is higher compared to the constant frequency control, the period (pulse within) of the driving voltage SW is shorter compared to the constant frequency control. When the MOS FET is turned on, since the current I flows in the opposite direction through the body diode of the MOS FET, it becomes the ZVS and switching loss does not occur during turning on. When the MOS FET is turned off, since the current I is blocked in the vicinity of a peak, switching loss is greater compared to the constant frequency control. In addition, since the control frequency is increased compared to the constant frequency control, switching loss is greater in the step-down control. However, the converter controller 13 includes a function of over voltage protection (OVP) to suppress the OCV. During the step-down control, switching loss due to the step-down control does not influence the efficiency of the PCS by stopping the output of the LLC resonant converter 10 in compliance with the increase of the input voltage by the OVP.

As described above, in the normal input voltage range in which the input voltage Vin is increased by the MPPT, it is possible to increase the efficiency by the constant frequency control. In addition, even if sunlight is poor and the input voltage Vin is lower than the normal input voltage range, it is possible to increase the efficiency by the boost control. It is possible to realize high efficiency in all ranges of output power of the solar power generation. In addition, if the input voltage Vin is higher than the normal input voltage range when the output of the inverter 11 is stopped, it is possible to suppress influence on the secondary side capacitor voltage by suppression of the OCV.

Moreover, in the constant frequency control, the converter controller 13 may change the control frequency within the first frequency range that is set in advance without constantly maintaining the control frequency. For example, the first frequency range may include the specific control frequency f1. For example, in the constant frequency control, the converter controller 13 may set the control frequency to be high as the input voltage Vin is high. In this case, for an inclination (change rate) of the control frequency with respect to the input voltage Vin, an inclination in the constant frequency control may be smaller than inclinations in the boost control and the step-down control.

In addition, in the boost control, the converter controller 13 may change the output voltage Vdc within the first voltage range that is set in advance without constantly maintaining the output voltage Vdc. For example, the first voltage range may include the lower limit value V21 of the output voltage range. In addition, in the step-down control, the converter controller 13 may maintain the output voltage Vdc within the second voltage range that is higher than the first voltage range without constantly maintaining the output voltage Vdc. For example, the second voltage range may include the upper limit value V22 of the output voltage range. In the step-down control and the boost control, even if the output voltage is changed, the effect of a reduction of switching loss is obtained.

In addition, the converter controller 13 may change the duty ratio of the driving voltage SW within a duty ratio range that is set in advance.

Next, a modification example of the example will be described.

Figure 7:
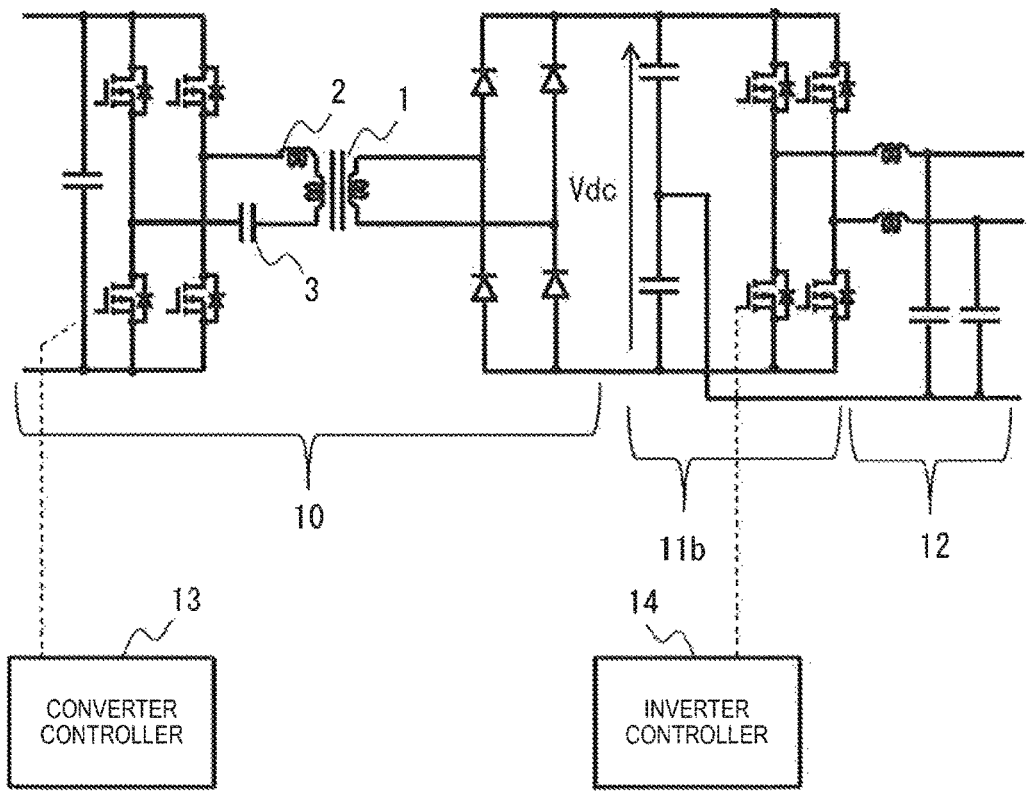
FIG. 7 illustrates a configuration of a PCS of a first modification example of Example 1.

FIG. 7 illustrates a configuration of a PCS of a first modification example of Example 1.

When compared to the PCS of Example 1, the PCS of the first modification example includes an inverter 11b instead of the inverter 11. As the first modification example, the inverter 11b may include a Si or a SiC MOS FET as the driving element instead of the IGBT or may include a MOS FET having the same function.

Figure 8:
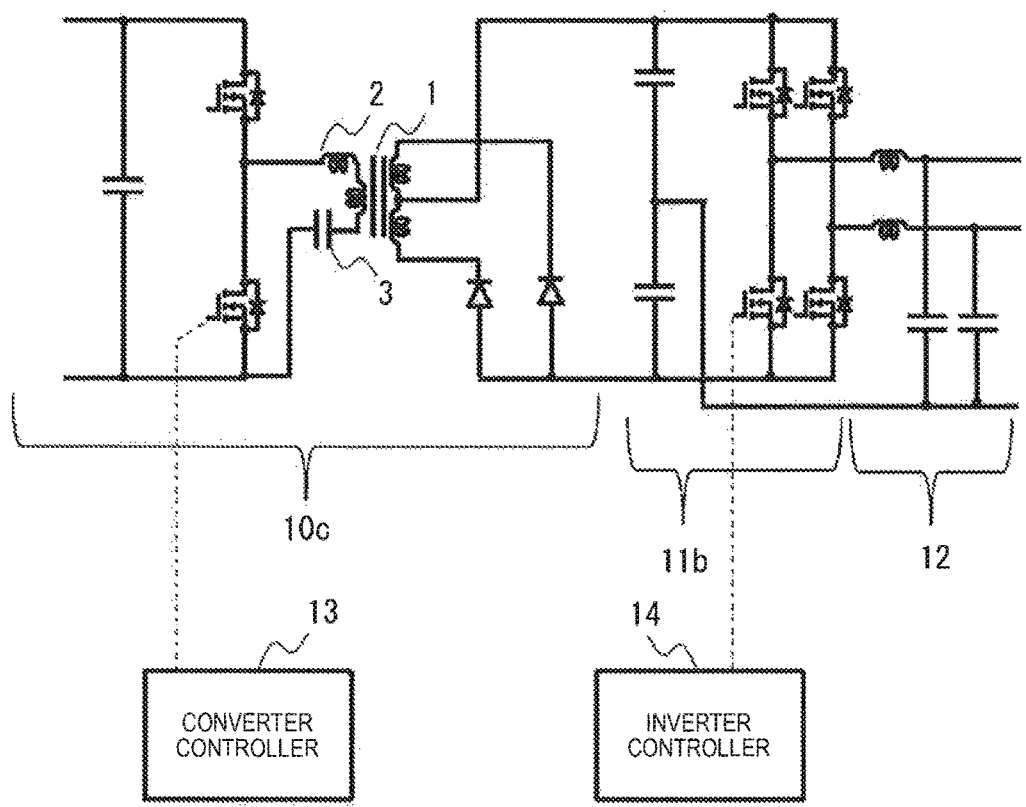
FIG. 8 illustrates a configuration of a PCS of a second modification example of Example 1.

FIG. 8 illustrates a configuration of a PCS of a second modification example of Example 1.

When compared to the PCS of the first modification example, the PCS of the second modification example includes an LLC resonant converter 10c instead of the LLC resonant converter 10. As the second modification example, the LLC resonant converter 10c may include driving elements having the number thereof half that of the LLC resonant converter 10 as the driving element. A voltage width of a voltage that is input on the primary side of the high frequency transformer 1 of the LLC resonant converter 10c is ½ of a voltage width in the LLC resonant converter 10, but may be adjusted to be the same voltage as Example 1 by a winding number ratio of the high frequency transformer 1.

Example 2

Figure 9:
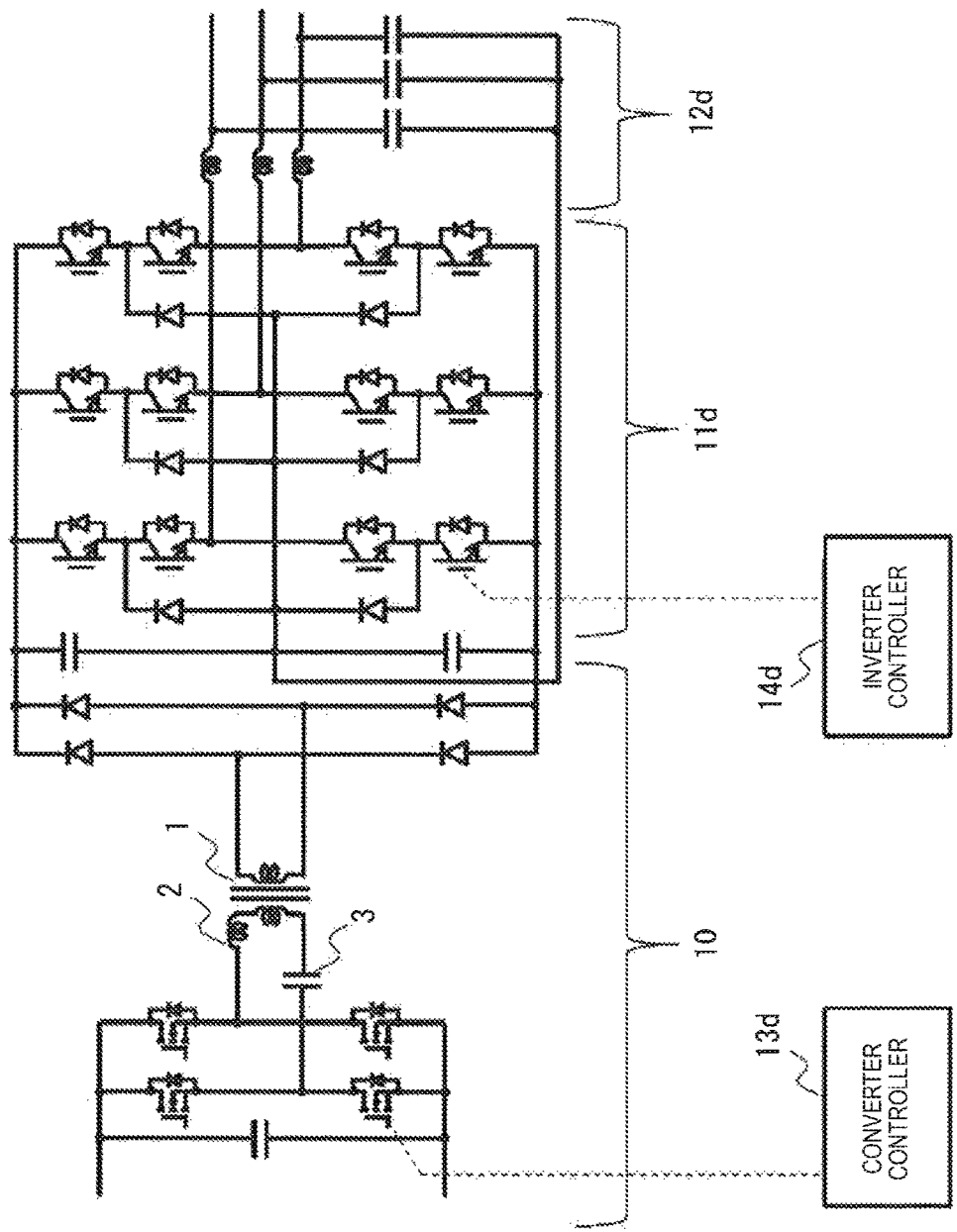
FIG. 9 illustrates a configuration of a PCS of Example 2.

FIG. 9 illustrates a configuration of a PCS of Example 2.

The example is assumed to be the PCS of a class of several hundreds of kW interconnecting to a high voltage (for example, a system of 6.6 KV). In the PCS of the example, elements to which the same reference numerals as those of the elements of the PCS of Example 1 are given are the same or corresponding elements and description thereof will be omitted. When compared to the PCS of Example 1, the PCS of the example includes an inverter 11d instead of the inverter 11, includes a converter controller 13d instead of the converter controller 13, and an inverter controller 14d instead of the inverter controller 14. The inverter 11d is a three-phase and three-level inverter, and includes four driving elements for one phase. The inverter controller 14d performs PWM control of the inverter 11d. Thus, it is possible to further reduce switching loss.

If a primary side input maximum voltage of an H-bridge type LLC resonant converter 10 is 1000 V, as a MOS FET, SiC MOS FET suitable for high voltage-resistant and high frequency switching may be applied.

Since a switching frequency such as PWM in the inverter 11d is equal to or less than several kHz that is lower compared to the control frequency of the LLC resonant converter, the IGBT is assumed to be applied as a driving element, but a Si or SiC MOS FET may be applied, or another MOS FET diode having the same function such as GaN may be applied.

Next, a control method of the LLC resonant converter 10 of the example will be described.

Figure 10:
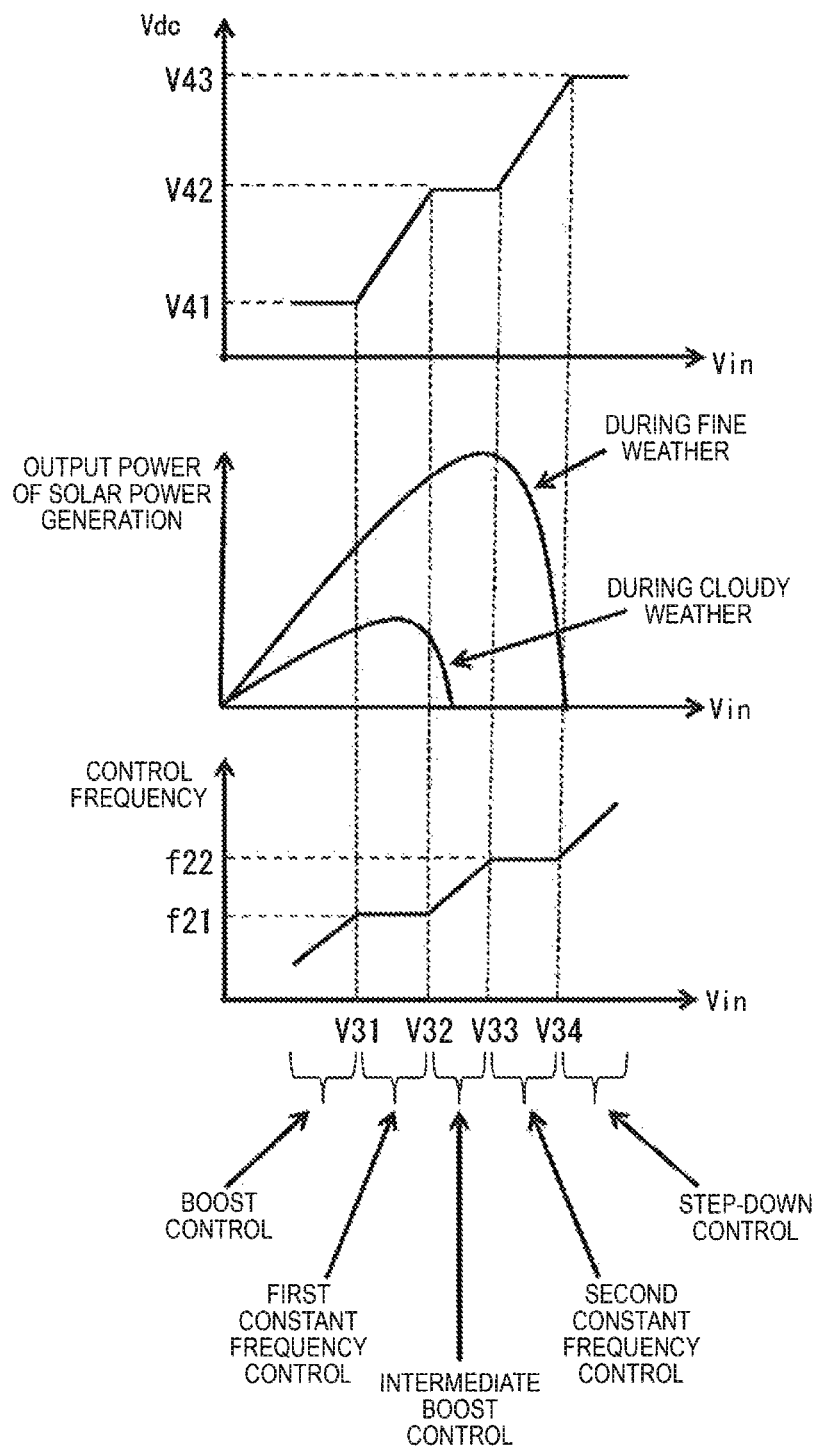
FIG. 10 illustrates a control method of an LLC resonant converter of Example 2.

FIG. 10 illustrates the control method of the LLC resonant converter 10 of Example 2.

An upper stage of the view illustrates a secondary side output voltage Vdc of the LLC resonant converter 10 with respect to an input voltage Vin of the LLC resonant converter 10. An intermediate stage of the view illustrates output power of the solar power generation with respect to the input voltage Vin during fine weather and output power of the solar power generation during cloudy weather. A lower stage of the view illustrates the control frequency of the LLC resonant converter 10 with respect to the input voltage Vin.

A low input voltage range and a high input voltage range are set in advance with respect to the input voltage Vin. The low input voltage range is determined by a lower limit value V31 (first voltage value) and an upper limit value V32 (third voltage value) and the high input voltage range is determined by a lower limit value V33 (fourth voltage value) and an upper limit value V34 (second voltage value). The low input voltage range may include the maximum power point voltage during cloudy weather (including during rainy weather). The high input voltage range may include the maximum power point voltage during fine weather. In addition, the output voltage range is set in advance with respect to the output voltage Vdc. The output voltage range is determined by a lower limit value V41 and an upper limit value V43. In addition, an intermediate value V42 is set in advance between the lower limit value V41 and the upper limit value V43 of the output voltage range.

The converter controller 13d performs a first constant frequency control (second frequency maintaining control) for maintaining the control frequency in a first control frequency f21 that is set in advance in the low input voltage range similar to the constant frequency control. Thus, the secondary side output voltage Vdc is changed in proportion to the input voltage Vin. For example, if the input voltage Vin is changed from the lower limit value V31 to V32 of the low input voltage range, the output voltage Vdc is changed from the lower limit value V41 to the intermediate value V42 of the output voltage range.

The converter controller 13d performs a second constant frequency control (third frequency maintaining control) for maintaining the control frequency in a second control frequency f22 that is higher than the first control frequency f21 in the high input voltage range similar to the constant frequency control. Thus, the secondary side output voltage Vdc is changed in proportion to the input voltage Vin. For example, if the input voltage Vin is changed from the lower limit value V33 to V34 of the high input voltage range, the output voltage Vdc is changed from the intermediate value V42 to the upper limit value V43 of the output voltage range.

If the input voltage Vin is lower than the low input voltage range, the converter controller 13d performs the boost control in which the control frequency is decreased in compliance with the decrease of the input voltage Vin. Thus, the converter controller 13d suppresses reduction of the output voltage Vdc and maintains the output voltage Vdc at the lower limit value V41 of the output voltage range.

If the input voltage Vin is higher than the high input voltage range in the OCV, the converter controller 13d performs the step-down control in which the control frequency is increased in compliance with the increase of the input voltage Vin. Thus, the converter controller 13d suppresses the increase of the output voltage Vdc and maintains the output voltage Vdc at the upper limit value V43 of the output voltage range.

An input voltage threshold value is set in advance between the upper limit value V32 of the low input voltage range and the lower limit value V33 of the high input voltage range. If the input voltage Vin is lower than the input voltage threshold value, the inverter controller 14d operates the inverter 11d as the three-level inverter and if the input voltage Vin is higher than the input voltage threshold value, the inverter controller 14d performs switching control in which the inverter 11d is operated as the two-lever inverter. If the input voltage Vin is equal to or greater than the upper limit value V32 of the low input voltage range and is equal to or less than the lower limit value V33 of the high input voltage range, the converter controller 13d performs an intermediate boost control (third voltage maintaining control) in which the control frequency is decreased in compliance with the decrease of the input voltage Vin similar to the boost control. Thus, the converter controller 13d maintains the output voltage Vdc at the intermediate value V42 of the output voltage range and can prevent chattering in the switching control. Moreover, the inverter controller 14d may perform the switching control with hysteresis in the increase and decrease of the input voltage Vin.

In the constant frequency control, similar to Example 1, switching loss is small and switching having high efficiency can be realized.

In the boost control and the intermediate boost control, similar to Example 1, switching loss is small and switching having high efficiency can be realized.

In the step-down control, similar to Example 1, switching loss does not occur during turning on and switching loss is large compared to the constant frequency control, but switching loss does not influence the efficiency of the PCS by the suppression of the OCV.

Moreover, in the first constant frequency control, the converter controller 13d may change the control frequency within the second frequency range that is set in advance without constantly maintaining the control frequency. For example, the second frequency range may include the first control frequency f21. In addition, in the second constant frequency control, the converter controller 13d may change the control frequency within the third frequency range that is higher than the second frequency range without constantly maintaining the control frequency. For example, the third frequency range may include the second control frequency f22. For example, in the first constant frequency control and the second constant frequency control, the converter controller 13d may set the control frequency higher as the input voltage Vin is increased. In this case, the inclinations in the first constant frequency control and the second constant frequency control, may be smaller than the inclinations in the boost control, the intermediate boost control, and the step-down control.

In addition, in the intermediate boost control, the converter controller 13d may change the output voltage Vdc within the third voltage range that is higher than the first voltage range and lower than the second voltage range without constantly maintaining the output voltage Vdc. For example, the first voltage range may include the lower limit value V41 of the output voltage range, the third voltage range may include the intermediate value V42 of the output voltage range, and the second voltage range may include the upper limit value V43 of the output voltage range.

Moreover, the converter controller 13d may perform the control of Example 1.

Figure 11:
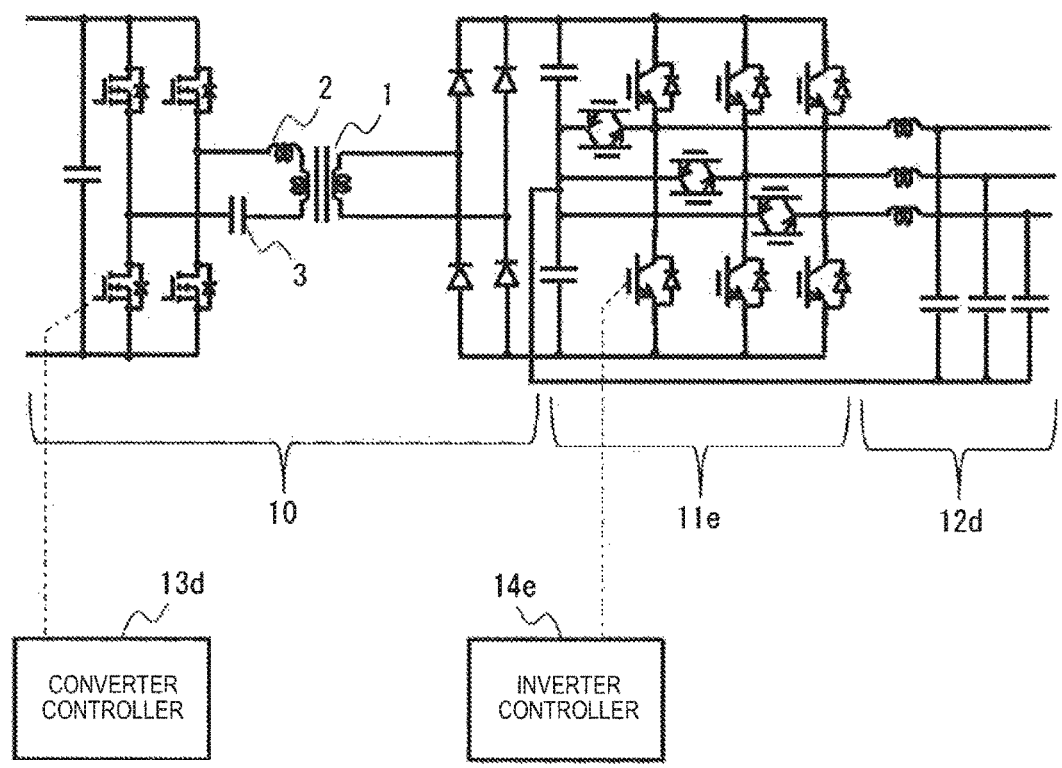
FIG. 11 illustrates a configuration of a PCS of a modification example of Example 2.

FIG. 11 illustrates a configuration of a PCS of a modification example of Example 2.

When compared to the PCS of Example 2, the PCS of the modification example includes the inverter 1ie instead of the inverter 11d and includes an inverter controller 14e instead of the inverter controller 14d. The inverter 11e is a new three-phase and three-level inverter and includes three driving elements for one phase. The inverter controller 14e performs PWM control of the inverter 1ie. Thus, it is possible to further reduce switching loss.

According to each example described above, the PCS prevents a reduction of efficiency due to high frequency driving by the SST with respect to the wide range of the input voltage. In addition, it is possible to reduce switching loss of the power device by the high frequency while suppressing variation width of the output voltage of the LLC resonant converter. As a result, it is possible to replace the transformer for system interconnection of the related art that is driven with the same low frequency as the system to the SST. Thus, it is possible to realize a reduction of the size and weight of the PCS.

The invention is not limited to the above-described examples and can be changed to various other aspects in a range that does not depart from the spirit thereof. Above, examples are provided, but, of course, it may be used in combination with contents described in the examples depending on the application thereof. Moreover, the invention can be applied to a power conversion apparatus that is connected to another power supply such as a battery.

What is claimed is:

1. A power conversion apparatus comprising:
an LLC resonant type DC/DC converter that changes a voltage of DC power from a power supply;
an inverter that converts DC power from the DC/DC converter into AC power;
a converter controller that controls the DC/DC converter; and
an inverter controller that controls the inverter,
wherein if an input voltage of the DC/DC converter is lower than a first voltage value that is set in advance, the converter controller maintains an output voltage of the DC/DC converter within a first voltage range that is set in advance by changing an operation frequency of switching of the DC/DC converter in compliance with the input voltage as a first voltage maintaining control,
wherein if the input voltage is higher than a second voltage value that is higher than the first voltage value, the converter controller maintains the output voltage within a second voltage range that is higher than the first voltage range by changing the operation frequency in compliance with the input voltage as a second voltage maintaining control,
wherein the converter controller increases the operation frequency as the input voltage is increased in the first voltage maintaining control and increases the operation frequency as the input voltage is increased in the second voltage maintaining control,
wherein if the input voltage is higher than a third voltage value and is lower than a fourth voltage value, the converter controller uses: (i) the third voltage value that is higher than the first voltage value and (ii) the fourth voltage value that is higher than the third voltage value and lower than the second voltage value, and maintains the output voltage within a third voltage range that is higher than the first voltage range and lower than the second voltage range by increasing the operation frequency as the input voltage is increased as a third voltage maintaining control,
wherein if the input voltage is equal to or greater than the first voltage value and is equal to or less than the third voltage value, the converter controller maintains the operation frequency within a second frequency range that is set in advance as a second frequency maintaining control, and
wherein if the input voltage is equal to or greater than the fourth voltage value and is equal to or less than the second voltage value, the converter controller maintains the operation frequency within a third frequency range that is higher than the second frequency range as a third frequency maintaining control.

2. The power conversion apparatus according to claim 1, wherein if the input voltage is equal to or greater than the first voltage value and is equal to or less than the second voltage value, the converter controller increases the output voltage as the input voltage is increased by maintaining the operation frequency within a first frequency range that is set in advance as a first frequency maintaining control.

3. The power conversion apparatus according to claim 2, wherein the converter controller increases the operation frequency as the input voltage is increased in the first frequency maintaining control, and
wherein for a change rate indicating a change in the operation frequency with respect to a change in the input voltage, a change rate in the first frequency maintaining control is smaller than change rates in the first voltage maintaining control and the second voltage maintaining control.

4. The power conversion apparatus according to claim 3, wherein the inverter is a two-level inverter.

5. The power conversion apparatus according to claim 1, wherein the converter controller increases the operation frequency as the input voltage is increased in the second frequency maintaining control and the third frequency maintaining control, and wherein for a change rate indicating a change in the operation frequency with respect to a change in the input voltage, change rates in the second frequency maintaining control and the third frequency maintaining control are smaller than change rates in the first voltage maintaining control, the second voltage maintaining control, and the third voltage maintaining control.

6. The power conversion apparatus according to claim 5, wherein the inverter is a three-level inverter.

7. The power conversion apparatus according to claim 6, wherein the inverter controller switches the inverter between a three-level operation and a two-level operation in the third voltage maintaining control.

8. The power conversion apparatus according to claim 1, wherein the converter controller maintains a duty ratio of a driving signal of the DC/DC converter within a duty ratio range that is set in advance.

9. The power conversion apparatus according to claim 1, wherein the converter controller stops an output of the DC/DC converter by an over voltage protection (OVP) in the second voltage maintaining control.

10. The power conversion apparatus according to claim 1, wherein the power supply is a solar power generation device; and wherein the converter controller performs a maximum power point tracking (MPPT) with respect to the DC/DC converter, wherein the first voltage value is equal to or less than a lower limit of a maximum power point voltage of the solar power generation device, and wherein the second voltage value is equal to or greater than an upper limit of the maximum power point voltage.

* * * * *